United States Patent
Aguilera et al.

(10) Patent No.: US 12,197,935 B2
(45) Date of Patent: Jan. 14, 2025

(54) MIGRATING VIRTUAL MACHINES IN CLUSTER MEMORY SYSTEMS

(71) Applicant: VMware LLC, Palo Alto, CA (US)

(72) Inventors: Marcos K. Aguilera, Palo Alto, CA (US); Pratap Subrahmanyam, Palo Alto, CA (US); Sairam Veeraswamy, Coimbatore (IN); Praveen Vegulla, Bellevue, WA (US); Rajesh Venkatasubramanian, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 568 days.

(21) Appl. No.: 17/495,900

(22) Filed: Oct. 7, 2021

(65) Prior Publication Data

US 2023/0021883 A1 Jan. 26, 2023

(30) Foreign Application Priority Data

Jul. 20, 2021 (IN) .............................. 202141032617

(51) Int. Cl.
*G06F 9/455* (2018.01)
*G06F 9/50* (2006.01)
*G06F 12/1009* (2016.01)

(52) U.S. Cl.
CPC ........ *G06F 9/45558* (2013.01); *G06F 9/5016* (2013.01); *G06F 9/5077* (2013.01); *G06F 12/1009* (2013.01); *G06F 2009/45583* (2013.01)

(58) Field of Classification Search
CPC .. G06F 9/45558; G06F 9/5016; G06F 9/5077; G06F 12/1009; G06F 2009/45583
See application file for complete search history.

(56) References Cited

U.S. PATENT DOCUMENTS

| 10,768,965 B1 * | 9/2020 | Habusha ............. G06F 9/45558 |
| 2012/0047312 A1 * | 2/2012 | Nathuji ................. G06F 9/3832 |
| | | 711/170 |

* cited by examiner

*Primary Examiner* — Gregory A Kessler
(74) *Attorney, Agent, or Firm* — King Intellectual Asset Management (57) ABSTRACT

Disclosed are various embodiments for optimizing the migration of pages of memory servers in cluster memory systems. To begin, a computing device can mark in a page table of the computing device that a page stored on a first memory host is not present. Then, the computing device can flush a translation lookaside buffer of the computing device. Next, the computing device can copy the page from the first memory host to a second memory host. Moving on, the computing device can update a page mapping table to reflect that the page is stored in the second memory host. Then, the computing device can mark in the page table of the computing device that the page stored in the second memory host is present. Subsequently, the computing device can discard the page stored on the first memory host.

20 Claims, 7 Drawing Sheets

MIGRATING VIRTUAL MACHINES IN CLUSTER MEMORY SYSTEMS

RELATED APPLICATIONS

Benefit is claimed under 35 U.S.C. 119(a)-(d) to Foreign Application Serial No. 202141032617 filed in India entitled "MIGRATING VIRTUAL MACHINES IN CLUSTER MEMORY SYSTEMS", on Jul. 20, 2021, by VMware, Inc., which is herein incorporated in its entirety by reference for all purposes.

The present application is related in subject matter to U.S. patent application Ser. No. 17/495,846, which is incorporated herein by reference.

BACKGROUND

Virtual machine hosts or bare metal hosts can make use of memory hosts in order to provide additional memory resources for processes or virtual machines executing on the host computing device. These memory hosts can often operate as part of a cluster, referred to as clustered memory, allowing for the resources of the memory hosts to be pooled to provide additional capacity and to distribute the load across multiple memory hosts. However, memory hosts and clustered memory have some shortcomings. For example, if a memory host fails or needs to be decommissioned or rebooted, the memory provided by the memory host would be unavailable to the bare metal or virtual machine hosts utilizing the memory host. As another example, if a memory host runs out of bandwidth, communication with the memory host is disrupted, impacting all bare metal or virtual machine hosts using the memory host. Moreover, capacity utilization of memory hosts can become unbalanced overtime, with some memory hosts becoming under-utilized while other memory hosts exhaust the amount of free memory that can be allocated to virtual machine hosts. In addition, there is no uniform latency for accessing different memory hosts in the cluster, and some virtual machine hosts are more sensitive to latency than others.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for improving the performance of processes, virtual machines, bare metal hosts, and virtual machine hosts in a clustered memory environment. While clustered memory is useful for efficiently providing additional memory resources to computing devices that need them, clustered memory also faces several problems. First, accesses of clustered memory are often both higher latency and have lower bandwidth compared to memory installed locally on a computing device. Second, memory hosts that provide clustered memory resources are susceptible to failure (e.g., because of a hardware or component failure, software crash, human error, etc.). If a memory host providing clustered memory to a computing device were to fail, the contents of the clustered memory would no longer be available to the computing device. This could cause the computing device to crash because computing devices are generally not designed to handle cases where parts of the available memory disappear in the middle of execution. Also, memory hosts that become bandwidth or latency constrained can result in performance penalties or, if the bandwidth or latency constraint lasts long enough, cause a computing device to crash because it believes that memory stored by the memory host is unavailable.

However, the various embodiments of the present disclosure address these deficiencies in a number of ways. First, several embodiments of the present disclosure provide for efficient migration of processes or virtual machines between hosts in order to minimize the impact on the hosts or the memory hosts. Second, several embodiments of the present disclosure efficiently migrate memory pages between memory hosts in the cluster in order to mitigate the impact of memory host failures or resource constraints.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
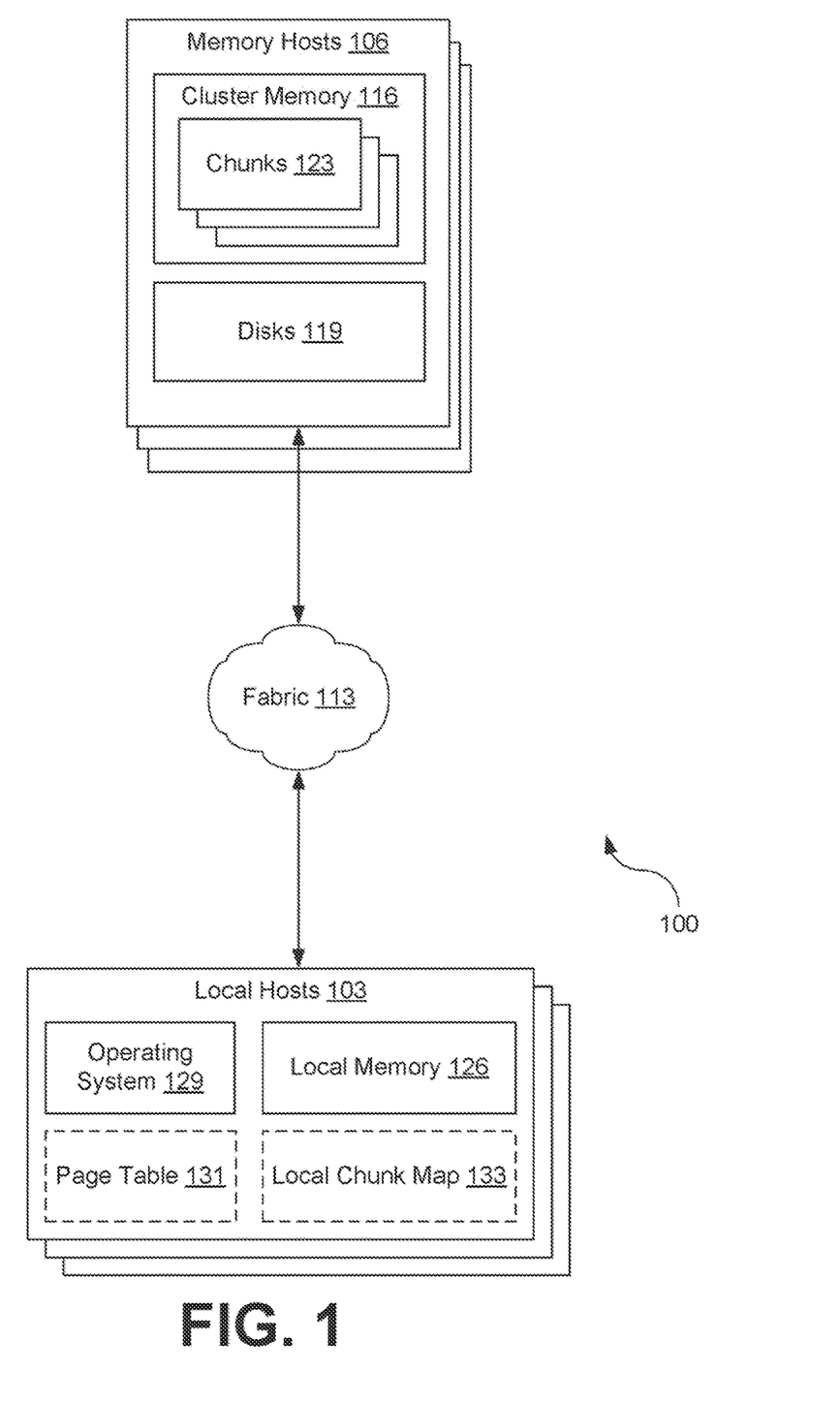
FIG. 1 is a drawing of a cluster environment according to various embodiments of the present disclosure.

FIG. 1 shows a cluster environment 100 according to various embodiments. The cluster environment 100 can include one or more local hosts 103 and one or more memory hosts 106, which can be in data communication with each other via a fabric 113. Computing devices such as the local host 103, memory hosts 106, and the management host 109 can include a processor, a memory, one or more disks, and/or a network interface.

The fabric 113 can include wide area networks (WANs), local area networks (LANs), personal area networks (PANs), a bus shared by many hosts, an interconnect between hosts and memory, or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The memory hosts 106 represent one or more computing devices that provide remotely accessible memory for local hosts 103 or other computing devices. By utilizing a memory host 106 to provide memory resources to local hosts 103, the memory available to individual local hosts 103 is physically or logically disaggregated from the local hosts 103. Accordingly, the collection of memory hosts 106 may be referred to as a clustered memory, pooled memory, disaggregated memory, hosted memory, remote memory, etc. Each memory host 106 can include cluster memory 116 and one or more disks 119.

The cluster memory 116 can represent the portion of memory of a memory host 106 that can be used for memory by a local host 103. To facilitate multiple local hosts 103 using the cluster memory 116, the cluster memory 116 can be divided into chunks 123 of cluster memory 116, with individual chunks 123 of the cluster memory 116 being allocated to individual local hosts 103. For example, the cluster memory 116 of a memory host 106 could be divided into one gigabyte chunks 123 comprising 262,144 pages that are four kilobytes each in size, and individual one gigabyte chunks 123 could be allocated to respective local hosts 103.

In some implementations, individual chunks 123 of the cluster memory 116 can be implemented as byte-addressable cluster memory 116 for the respective local host 103. In byte-addressable cluster memory 116, a computing device can directly read data from or write data to individual memory addresses of the cluster memory 116 of a memory host 106.

In other implementations, individual chunks 123 of the cluster memory 116 can be implemented as paged cluster memory 116 for the respective local host 103. In these implementations, the virtual memory manager of the operating system 129 manages access to the cluster memory 116 of a memory host 106 using paging. Individual pages can be transferred between the local memory 126 of the local host 103 and the cluster memory 116 as needed. Likewise, individual pages can also be read from the cluster memory 116 of the memory hosts 106 in some instances.

The disks 119 can represent persistent or non-volatile storage, such as solid state drives (SSDs) and hard disk drives (HDDs). A discussed later, a memory host 106 may optionally use disks 119 to provide additional memory storage to local hosts 103 for infrequently accessed pages of memory.

The local hosts 103 can represent any computing device utilizing the cluster memory 116 provided by the memory hosts 106. Accordingly, the local host 103 can have a local memory 126 divided or organized into one or more local pages. The local host 103 can also have an operating system 129, a page table 131, and a local chunk map 133.

The operating system 129 can include any system software that manages the operation of computer hardware and software resources of the local host 103. The operating system 129 can also provide various services or functions to computer programs, such as processes, that are executed by the local host 103. For example, the operating system 129 may schedule the operation of tasks or processes by the processor of the local host 103. The operating system 129 may also provide virtual memory management functions to allow each process executing on the local host 103 to have its own logical or virtual address space, which the operating system 129 can map to physical addresses in the local memory 126 and/or cluster memory 116. When referring to the operating system 129, the operating system 129 can include both hypervisors and/or any other system software that manages computer hardware and software resources. Likewise, the term process can include virtual machines as well as any other executing or executable computer program.

The page table 131 is a data structure used by the virtual memory system of the operating system 129 to store the mapping between virtual addresses and physical addresses, where virtual addresses are used by the process executing on the local host 103 and physical addresses are used by the hardware of the local host 103 to access data in the memory 106. Each mapping in the page table can be referred to as a page table entry, which can map a virtual page to a physical page. For pages stored locally on the local host 103, the page table 131 can have an entry that maps a virtual page to a physical page of the memory 106. For pages that are stored in cluster memory, the page table 131 can have an entry that maps a virtual page to an entry in the local chunk map 133 that specifies the location of the mapped page in cluster memory.

The local chunk map 133 can represent a data structure maintained by the local host 103 to track which chunks 123 of cluster memory 116 on respective memory hosts 106 are allocated to or currently used by the local host 103. The local chunk map 133 can also indicate the offsets within the cluster memory 116 where a chunk is stored. Accordingly, when a process or virtual machine attempts to access a page stored in a chunk 123 in cluster memory 116, the operating system can refer to the local chunk map 133 to identify the specific memory host 106 and chunk 123 where the page is stored in cluster memory 116 as well as the address offset that specifies the location within the cluster memory 116 where the page is located.

Next, a description of the operation of the various components of the cluster environment 100 is provided. Although the following descriptions illustrate how the various components of the cluster environment 100 can interact with each other, it is understood that other interactions are also contemplated by the various embodiments of the present disclosure.

Figure 2A:
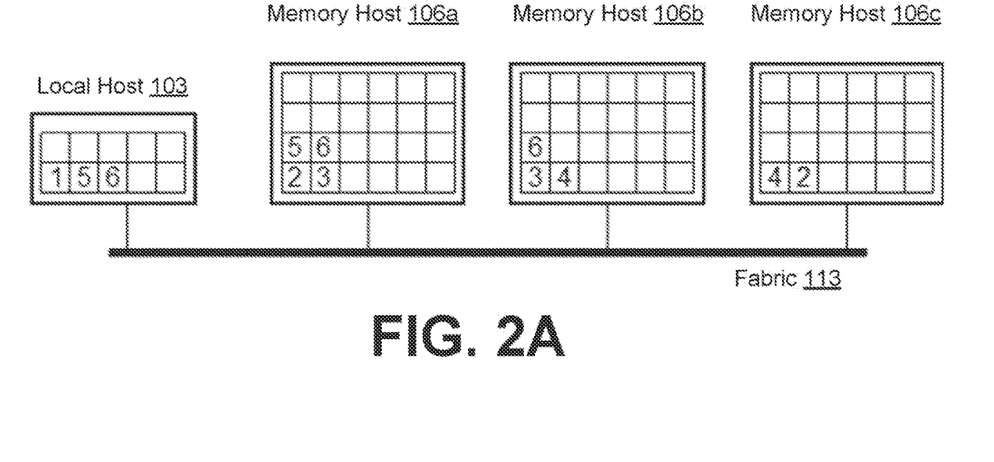
FIG. 2A and FIG. 2B illustrate examples of cluster memory according to various embodiments of the present disclosure.

FIG. 2A provides a pictorial depiction of using replication to improve resiliency of implementations that make use of paged cluster memory 116. As illustrated, page 1 is stored in the local memory 126 of the local host 103, while pages 2, 3, and 4 are replicated and stored in the cluster memory 116 of multiple memory hosts 106a, 106b, and 106c (collectively, "memory hosts 106"). Although pages 5 and 6 are also stored in the local memory 126 of the local host 103, they are also illustrated as being in the process of being replicated and stored in the cluster memory 116 of multiple memory hosts 106.

Figure 2B:
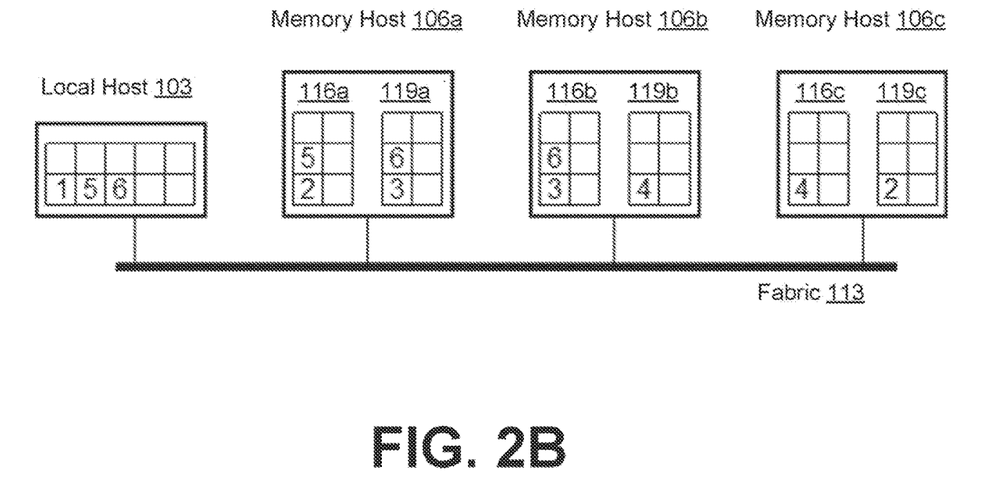

However, dynamic random access memory (DRAM) is expensive. Accordingly, FIG. 2B illustrate an alternative implementation where pages are stored using a combination of cluster memory 116 of memory hosts 106 and disks 119 of memory hosts 106. In FIG. 2B, page 1 is stored in local memory 126 of the local host 103, while pages 2, 3, 4, and 6 are replicated and stored in the cluster memory 116 of multiple memory hosts 106a, 106b, and 106c (collectively, "memory hosts 106"). Meanwhile, page 5 is in the process of being replicated and stored across multiple memory hosts 106, but is currently stored only in the cluster memory 116a of memory host 106a. As illustrated, some of the memory hosts 106 store the pages in cluster memory 116, while other memory hosts 106 store the pages on disk 119. By storing a redundant copy of a page on disk 119, redundancy can be provided using disks 119 that may offer lower storage costs compared to the DRAM used for cluster memory 116.

Figure 3:
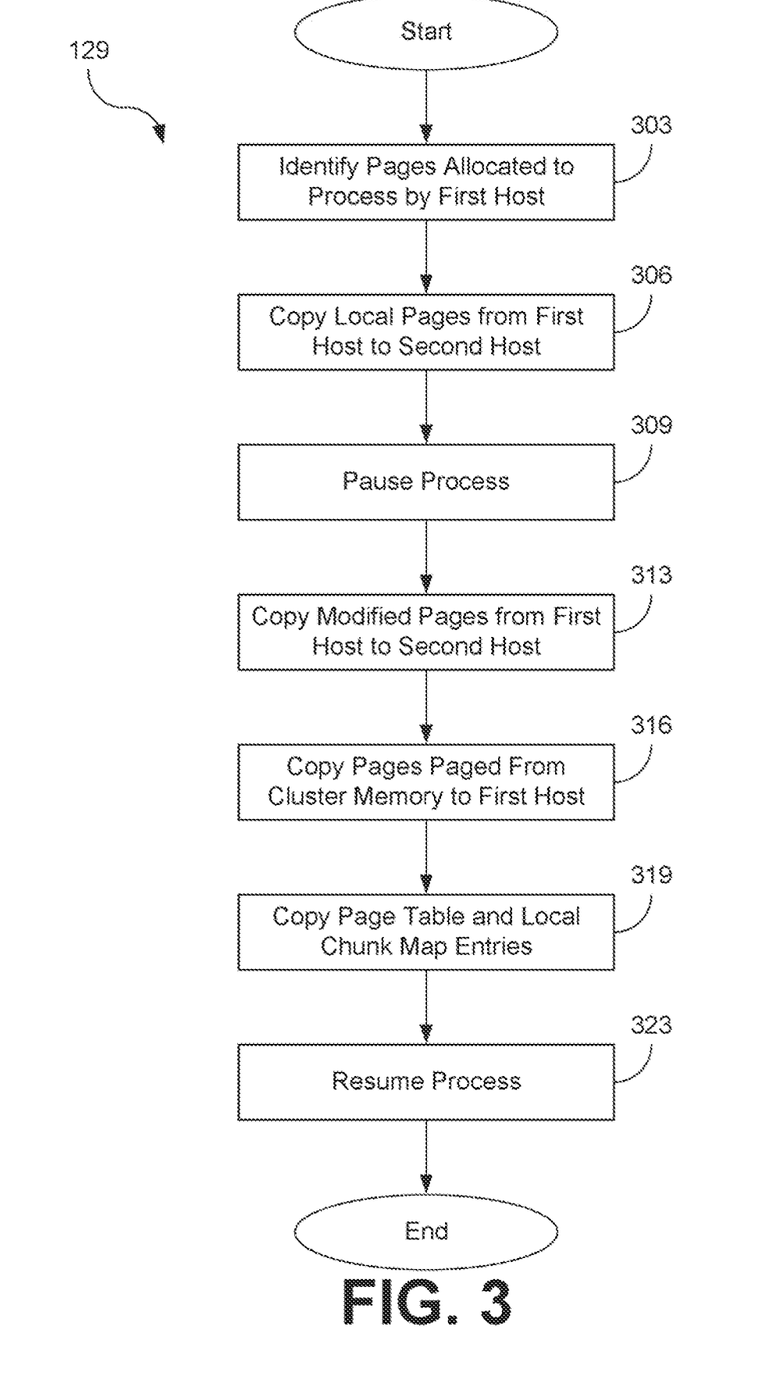
FIGS. 3-7 are flowcharts illustrating various examples of functionality implemented in the cluster environment of FIG. 1 according to various embodiments of the present disclosure.

Referring next to FIG. 3, shown is a flowchart that provides one example of the operation of a portion of the operating system 129. The flowchart of FIG. 3 provides merely an example of the many different types of functional arrangements that can be employed to implement the operation of the depicted portion of the operating system 129. As an alternative, the flowchart of FIG. 3 can be viewed as depicting an example of elements of a method implemented within the cluster environment 100.

Beginning with block 303, the operating system 129 can identify the pages in the local memory 126 (referred to herein as "local pages") of the current local host 103 that have been allocated to a process (or a virtual machine) executing on the local host 103. This could be done, for example, in response to the operating system receiving an instruction (e.g., a request or command) to migrate the process or virtual machine from the current local host 103 to a new local host 103.

Then, at block 306, the operating system 129 can copy the local pages from the current local host 103 to a new local host 103. The new local host 103 could have been specified, for example, in the initial instruction to migrate the process or virtual machine from the current local host 103 to a new local host 103. Alternatively, the operating system 129 could select the new local host 103 from a plurality of available local hosts 103 according to various criteria (e.g., current resource utilization of the potential new local host 103, predicted resource utilization of the potential new local host 103, etc.), and then copy the local pages identified at block 303 from the current local host 103 to the selected new local host 103. While the local pages are being copied from the current local host 103 to the new local host 103, the operating system 129 can also track which of the local pages are modified by the process or virtual machine. The operating system 129 can also track page faults associated with the process or virtual machine to determine which pages are paged in from cluster memory 116 of a memory host 106 to the local memory 126 as the process or virtual machine continues to execute.

Next, at block 309, the operating system 129 can pause the process or virtual machine currently executing on the local host 103. This can be done to allow the operating system 129 to identify and copy or move any local pages that were modified by the process or virtual machine during the copying of allocated pages that occurred at block 306.

Moving on to block 313, the operating system 129 can copy any modified local pages from the current local host 103 to the new local host 103.

Proceeding to block 316, the operating system 129 can then copy any pages from the local memory 126 that had been paged in from the cluster memory 116 of a memory host prior to the process or virtual machine being paused at block 309. For example, while local pages were copied at block 306 and the process or virtual machine continued to execute, the process or virtual machine could have accessed and/or modified one or more pages stored in the cluster memory 116 of a memory host 106. These pages could have been copied from the cluster memory 116 to the local memory 126 and/or modified in local memory 126. To make sure the state of the process or virtual machine remains consistent, these pages should also be copied from the local memory 126 of the current local host 103 to the local memory 126 of the new local host 103.

Referring to block 319, the operating system 129 can copy entries from the page table 131 and the local chunk map 133 from the current local host 103 to the new local host 103. Specifically, entries in the page table 131 and the local chunk map 133 that identify the locations of pages in clustered memory can be copied from the current local host 103 to the new local host 103 because the page table 131 and local chunk map 133 entries generally consume less memory than the pages themselves, it is often quicker and more efficient to transfer the page table 131 and local chunk map 133 entries from the current local host 103 to the new local host 103 rather than to copy the pages directly. This is possible to do because both the current local host 103 and the new local host 103 have access to the pages in clustered memory.

Finally, at block 323, the operating system 129 can cause the process or virtual machine to resume execution on the new local host 103. For example, the operating system 129 could communicate to the new local host 103 that all of the pages allocated to the process or the virtual machine have been copied and that all of the page table 131 entries and local chunk map 133 associated with the process or virtual machine have been transferred. This communication, when received by the new local host 103, could cause the new local host 103 to resume execution of the process or virtual machine.

Figure 4:
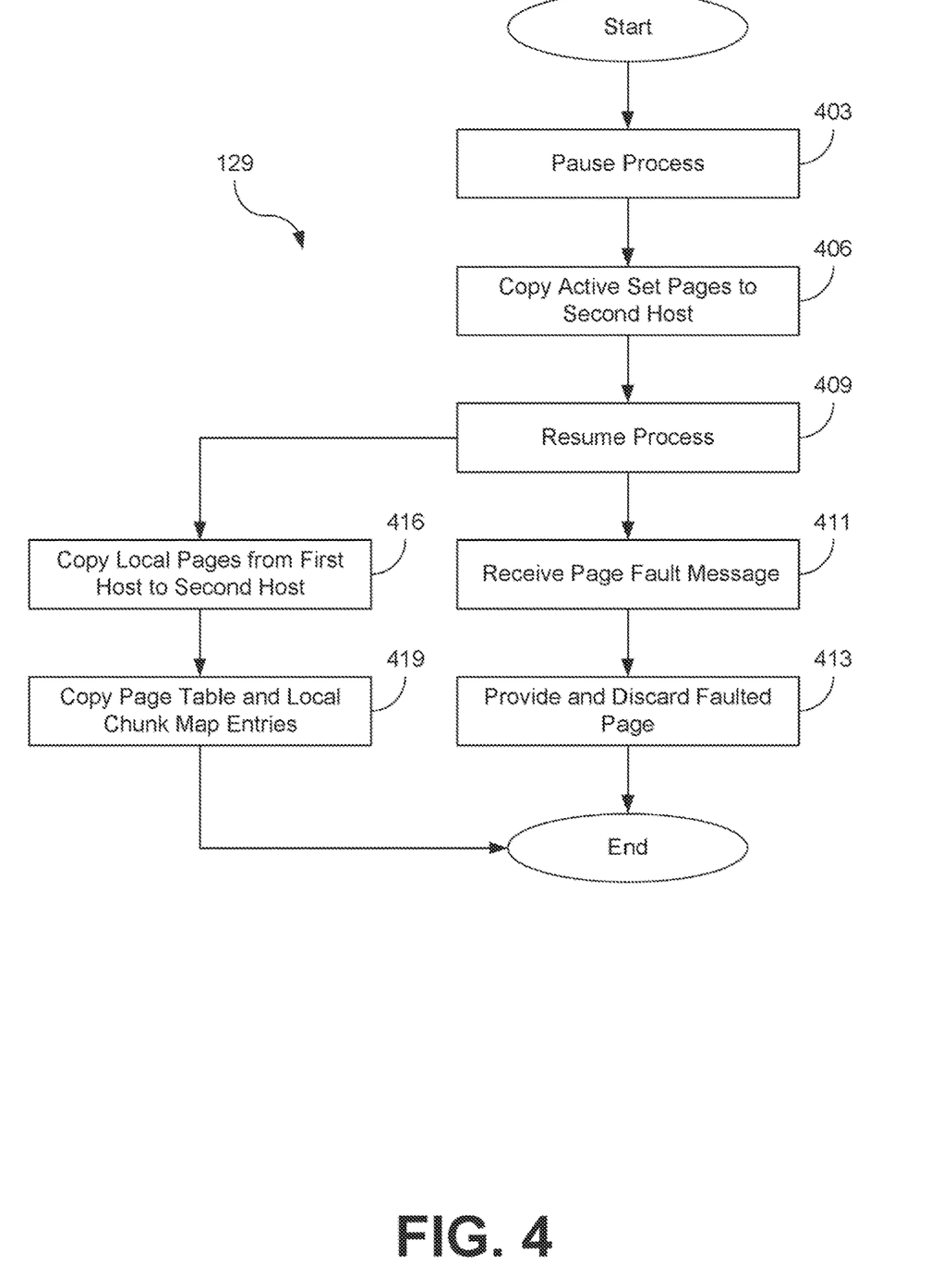

Referring next to FIG. 4, shown is a flowchart that provides one example of the operation of a portion of the operating system 129. The flowchart of FIG. 4 provides merely an example of the many different types of functional arrangements that can be employed to implement the operation of the depicted portion of the operating system 129. As an alternative, the flowchart of FIG. 4 can be viewed as depicting an example of elements of a method implemented within the cluster environment 100.

Beginning with block 403, the operating system 129 of the current local host 103 on which a process or virtual machine is executing can cause the process or virtual machine to pause execution. This could be done, for example, in response to the operating system receiving an instruction (e.g., a request or command) to migrate the process or virtual machine from the current local host 103 to a new local host 103. This can be done to allow the operating system 129 to move pages in the local memory 126 (referred to herein as "local pages") that are part of the active set of local pages allocated to the process or virtual machine without the process or virtual machine modifying those pages.

Then, at block 406, the operating system 129 can copy those local pages that are part of the active set of local pages allocated to the paused process or virtual machine. For example, the operating system 129 could determine that the local pages that have been accessed more frequently than a predefined threshold or have been accessed more recently than a predefined period of time are in active use by the paused process or virtual machine. These page, therefore, would be part of the active set of local pages allocated to the process or virtual machine. The operating system 129 could then cause these pages to be copied to the new local host 103.

The new local host 103 could be determined by the operating system 129 according to various approaches. The new local host 103 could have been specified, for example, in the initial instruction to migrate the process or virtual machine from the current local host 103 to a new local host 103. Alternatively, the operating system 129 could select the new local host 103 from a plurality of available local hosts 103 according to various criteria (e.g., current resource utilization of the potential new local host 103, predicted resource utilization of the potential new local host 103, etc.), and then copy the local pages identified at block 303 from the current local host 103 to the selected new local host 103. Once copied, the pages in the active set of local pages could be discarded from the current local host 103.

Next, at block 409, the operating system 129 can cause the process or virtual machine to resume execution on the new local host 103. For example, the operating system 129 could communicate to the new local host 103 that active set of local pages 103 has been transferred to the new local host 103, thereby allowing the process or virtual machine to resume its current state of execution on the new local host 103.

Moving on to block 411, the operating system 129 can receive a page fault message from the new local host 103. This page fault message could specify that the process or virtual machine has attempted to read from or write to a page outside of the set of local pages copied to the new local host 103. The page fault message could specify or identify the local page on the new local host 103 requested (e.g., by providing the virtual memory page number for the page).

Proceeding to block 413, the operating system 129 can retrieve and provide the requested page in response. For example, the operating system 129 could reference the page table 131 to determine the physical page in the local memory 126 of the current local host 103 mapped to the virtual page identified in the page fault message received at block 411. The operating system 129 could then copy the identified page to the new local host 103, and, once copied, discard the requested page from the current local host 103. If the requested page is located in cluster memory 116 of a memory host 106, then the operating system 129 could provide a reference from the page table 131 and the local chunk map 133 to the new local host 103, allowing the new local host 103 to retrieve the contents from the cluster memory 116 of the memory host 106. It should be noted that providing the reference from the page table 131 and the local chunk map 133 is more efficient because it avoids the page being copied from cluster memory 116 twice—a first time from the memory host 106 to the current local host 103 and a second time from the current local host 103 to the new local host 103.

In parallel, at block 416, the operating system 129 can copy local pages from the current local host 103 to the new local host 103. In some implementations, only those pages that have not been discarded (e.g., pages that, when accessed, do not result in a page fault) will be copied from the current local host 103 to the new local host 103. By ignoring local pages that, when accessed, result in a page fault or page not found condition, the operating system 129 is able to skip local pages that were copied previously at block 406 or in parallel at block 413.

Next, at block 419, the operating system 129 can copy entries from the page table 131 and the local chunk map 133 from the current local host 103 to the new local host 103. Specifically, entries in the page table 131 and the local chunk map 133 that identify the locations of pages in clustered memory associated with the process or virtual machine being migrated can be copied from the current local host 103 to the new local host 103. Because the page table 131 and local chunk map 133 entries generally consume less memory than the pages themselves, it is often quicker and more efficient to transfer the page table 131 and local chunk map 133 entries from the current local host 103 to the new local host 103 rather than to copy the pages directly. Once the page table 131 entries and local chunk map 133 entries are copied, the process depicted in FIG. 4 can end.

Figure 5:
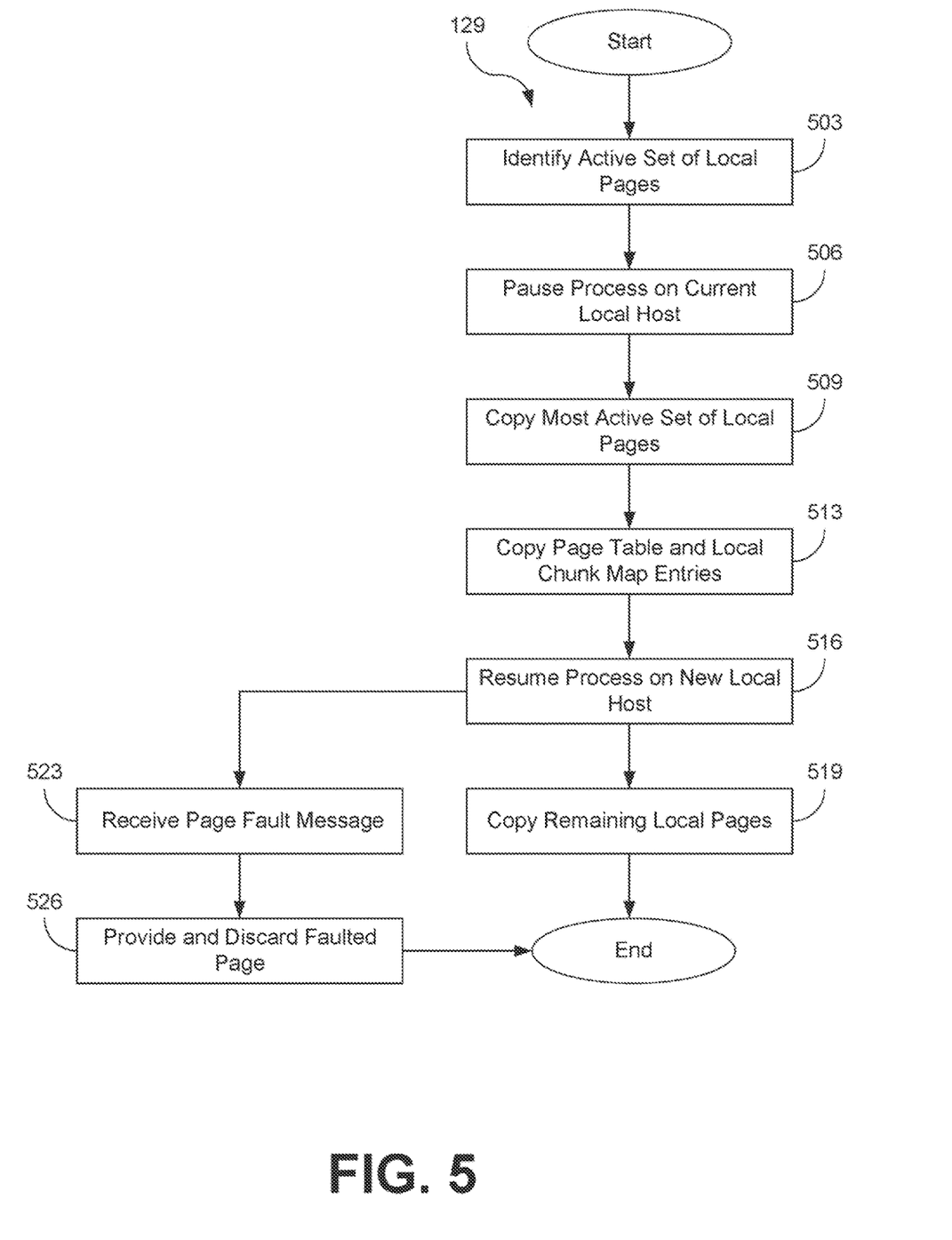

Referring next to FIG. 5, shown is a flowchart that provides one example of the operation of a portion of the operating system 129. The flowchart of FIG. 5 provides merely an example of the many different types of functional arrangements that can be employed to implement the operation of the depicted portion of the operating system 129. As an alternative, the flowchart of FIG. 5 can be viewed as depicting an example of elements of a method implemented within the cluster environment 100.

Beginning with block 503, the operating system 129 can identify those pages of the process that are in the active set of pages for the process. For example, the operating system 129 could identify the most frequently accessed pages in the local memory 106 (referred to herein as the most frequently accessed local pages). For example, the operating system 129 can determine whether local pages allocated to a process or virtual machine are written to or read from at a frequency greater than a predefined threshold. By identifying the most frequently accessed pages in the local memory 106, the operating system 129 is able to identify the pages within the active set of pages that are currently being used by the process or virtual machine to be migrated.

Then at block 506, the operating system 129 can pause the process or virtual machine to be migrated. This can be done in order to allow the active set of pages to be copied without the process or virtual machine modifying their contents.

Moving on to block 509, the operating system 129 can copy the active set of pages from the current local host 103 to a new local host 103. The new local host 103 may have been previously identified in the request, communication, or instructions to migrate the process or virtual machine from the current local host 103 to the new local host 103. Alternatively, the operating system 129 could select the new local host 103 from a plurality of available local hosts 103 according to various criteria (e.g., current resource utilization of the potential new local host 103, predicted resource utilization of the potential new local host 103, etc.), and then copy the local pages identified at block 503 from the current local host 103 to the selected new local host 103. Once a page is copied, the operating system 129 can discard the page from the local memory 126 or mark the page in the page table as not present.

Next, at block 513, the operating system 129 can copy entries from the page table 131 and the local chunk map 133 from the current local host 103 to the new local host 103. Specifically, entries in the page table 131 and the local chunk map 133 that identify the locations of pages in clustered memory associated with the process or virtual machine being migrated can be copied from the current local host 103 to the new local host 103. Because the page table 131 and local chunk map 133 entries generally consume less memory than the pages themselves, it is often quicker and more efficient to transfer the page table 131 and local chunk map 133 entries from the current local host 103 to the new local host 103 rather than to copy the pages directly. This is possible to do because both the current local host 103 and the new local host 103 have access to the pages in clustered memory. The operating system 129 can also cause the local host 103 to flush the translation lookaside buffer of the processor of the local host 103 in order to ensure that no pages or page mappings have been cached.

Proceeding to block 516, the operating system 129 can cause the process or virtual machine to resume on the new local host 103. For example, the operating system 129 could communicate to the new local host 103 that the active set of local pages 103 and the page table and local chunk map 133 entries have been transferred to the new local host 103, thereby allowing the process or virtual machine to resume its current state of execution on the new local host 103.

Then, at block 519, the operating system 129 can copy remaining ones of the local pages from the current local host 103 to the new local host 103. In some implementations, only those pages that have not been discarded (e.g., pages that, when accessed, do not result in a page fault) will be copied from the current local host 103 to the new local host 103. By ignoring local pages that, when accessed, result in a page fault or page not found condition, the operating system 129 is able to skip local pages that were copied previously at block 506 or in parallel at block 526.

Meanwhile, in parallel at block 523, the operating system 129 can receive a page fault message from the new local host 103. This page fault message could specify that the process or virtual machine has attempted to read from or write to a page outside of the set of local pages copied to the new local host 103. The page fault message could specify or identify the local page on the new local host 103 requested (e.g., by providing the virtual memory page number for the page).

Then, at block 526, the operating system 129 can retrieve and provide the requested page in response. For example, the operating system 129 could reference the page table 131 to determine the physical page in the local memory 126 of the current local host 103 mapped to the virtual page identified in the page fault message received at block 523. The operating system 129 could then copy the identified page to the new local host 103, and, once copied, discard the requested page from the current local host 103.

Figure 6:
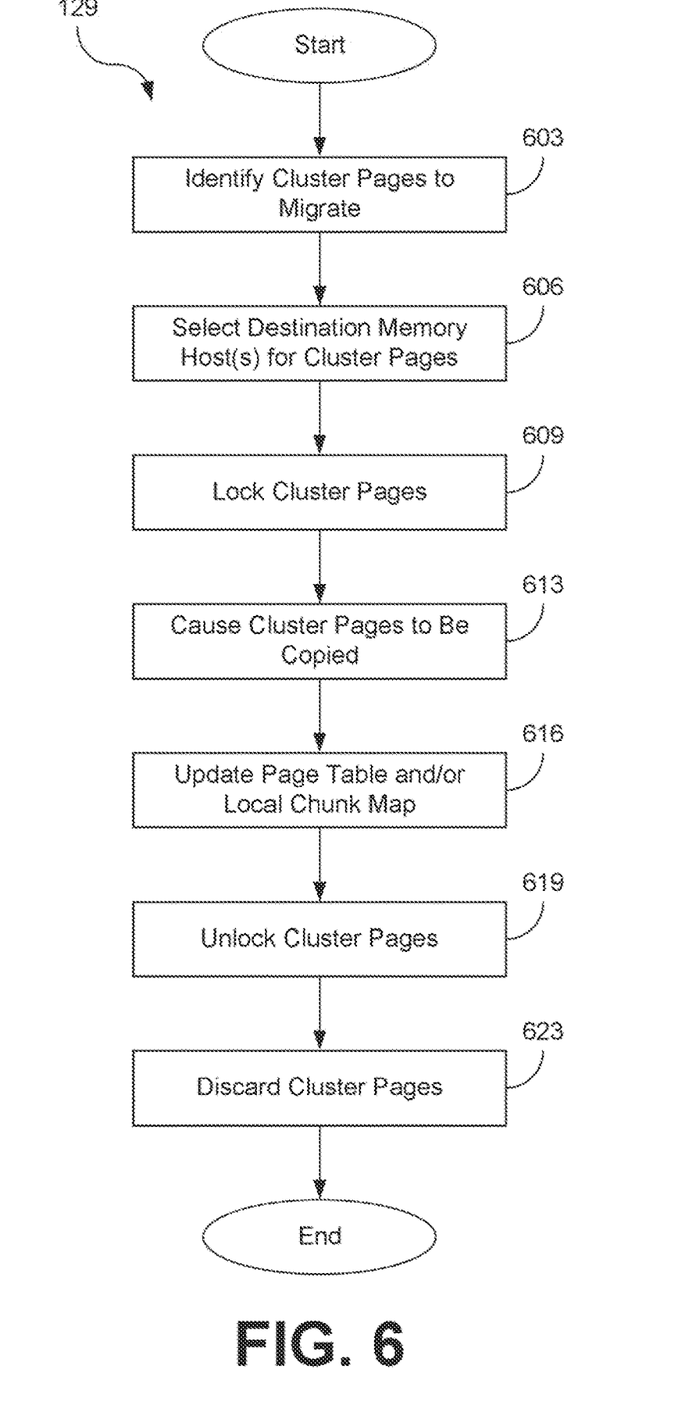

Referring next to FIG. 6, shown is a flowchart that provides one example of the operation of a portion of the operating system 129 for migrating memory between memory hosts 106. The flowchart of FIG. 6 provides merely an example of the many different types of functional arrangements that can be employed to implement the operation of the depicted portion of the operating system 129. As an alternative, the flowchart of FIG. 6 can be viewed as depicting an example of elements of a method implemented within the cluster environment 100.

Beginning with block 603, the operating system 129 can identify one or more pages in the cluster memory 116 (referred to herein as cluster pages) of a first memory host 106 to migrate. The cluster pages can be identified or selected based at least in part on a variety of criteria or reasons. For example, all of the cluster pages on the memory server 106 could be selected for migration because the memory server is slated to be powered off, decommissioned, rebooted, etc. As another example, the operating system 129 could detect that the memory server 106 is experiencing resource contention. For example, the amount of free cluster memory 116 available to the memory host 106 may have decreased below a predefined threshold reported by the memory host 106, the latency in accessing cluster pages may have exceeded a predefined threshold, the amount of available memory bandwidth or fabric bandwidth may be insufficient to service requests for cluster pages as measured by the bandwidth available when retrieving cluster pages from the memory host 106, etc.

Accordingly, the operating system 129 could select one or more cluster pages to migrate to another memory host 106 in order to resolve the resource contention. For example, if the resource contention is a lack of available cluster memory 116, the operating system 129 could select a number of cluster pages to migrate that would free a sufficient amount of cluster memory 116. As another example, if the resource contention were a lack of memory bandwidth or fabric bandwidth, the operating system 129 could select a number of cluster pages that are currently in use or predicted to be in use (e.g., based on principles of spatial or temporal locality) for migration to another memory host 106 sufficient to reduce the bandwidth consumed by the first memory host 106. Similarly, if the resource contention were a latency issue, the operating system 129 could select a number of cluster pages that are currently in use or predicted to be in use (e.g., based on principles of spatial or temporal locality) for migration to another memory host 106.

Then, at block 606, the operating system 129 can select a destination memory host 106 for those cluster pages identified at block 603. This can be done using a variety of approaches. For example, a destination memory host 106 could be selected based on a current resource status (e.g., a current amount of free cluster memory 116, a current latency, a current amount of available bandwidth, etc.). Where resource availability conflicts, such as when one potential memory host 106 has more available cluster memory 116, but another potential memory host 106 has more available bandwidth or a third memory host 106 has a lower average latency, then weighting factors can be applied to the different resource constraints to prioritize selecting one memory host 106 with more of one type of resource available compared to another memory host 106.

Moving on to block 609, the operating system 129 can then cause the cluster pages to be locked so that they cannot be modified by any active processes or virtual machines executing on the local host 103 while the pages are copied at block 613. When a process or virtual machine executing on the local host 103 attempts to read from or write to a locked cluster page, the page fault handler of the operating system 129 will delay processing the page fault until the locked pages have been copied. Once copied, the page fault handler of the operating system 129 can retrieve the cluster page from the destination memory host 106.

Next, at block 613, the operating system 129 can cause the cluster pages to be migrated from the original or current memory host 106 to the new memory host 106 selected at block 606. This can be done using a variety of approaches. For example, the operating system 129 could read the contents of each of the cluster pages and then write them to the new memory host 106 selected at block 613. Instead, the operating system 129 could send a message to the original or current memory host 106 to migrate the cluster pages to the new memory host 106. Once migration is complete, the original or current memory host 106 could send a response to the operating system 129 indicating that the move was complete. In this second approach, bandwidth is utilized more efficiently by avoiding the read of each page from the memory host 106 to the local host 103 that was previously described.

Proceeding to block 616, the operating system 129 can update the page table 131 and/or the local chunk map 133 of the local host 103 to reflect the location of the cluster pages on the destination memory host 106. For example, the local chunk map 133 could be updated to reflect the identify of the new memory host 106, the chunk of the cluster memory 116 used for the copied pages, and the offset within the chunk of the cluster memory 116 where the page is located. If needed, the page table 131 could also be updated to reflect the mapping of the virtual page of a process or virtual machine to the new or modified entry in the local chunk map 133.

Referring to block 619, the operating system 129 can cause the cluster pages on the original memory host 106 to be unlocked by sending a message to the original memory host 106 to unlock the pages. This can be done so that subsequent operations (e.g., discarding the pages) can be performed.

Then, at block 623, the operating system 129 can then discard the cluster pages of the original memory host 106. For example, the operating system 129 could cause the local host 103 to send a message to the original memory host 106 to discard the cluster pages from its cluster memory 116.

Figure 7:
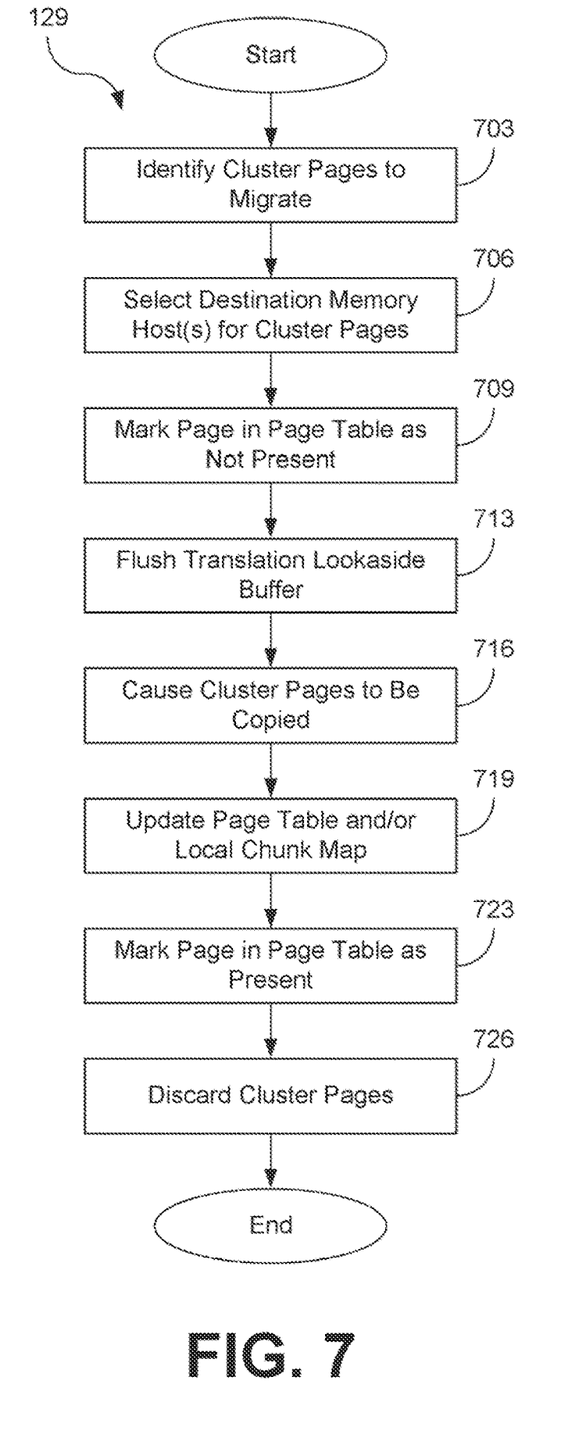

Referring next to FIG. 7, shown is a flowchart that provides one example of the operation of a portion of the operating system 129. The flowchart of FIG. 7 provides merely an example of the many different types of functional arrangements that can be employed to implement the operation of the depicted portion of the operating system 129. As an alternative, the flowchart of FIG. 7 can be viewed as depicting an example of elements of a method implemented within the cluster environment 100.

Beginning with block 703, the operating system 129 can identify one or more pages in the cluster memory 116 (referred to herein as cluster pages) of a first memory host 106 to migrate. The cluster pages can be identified or selected based at least in part on a variety of criteria or reasons. For example, all of the cluster pages on the memory server 106 could be selected for migration because the memory server is slated to be powered off, decommissioned, rebooted, etc. As another example, the operating system 129 could detect that the memory server 106 is experiencing resource contention. For example, the amount of free cluster memory 116 available to the memory host 106 may have decreased below a predefined threshold reported by the memory host 106, the latency in accessing cluster pages may have exceeded a predefined threshold, the amount of available memory bandwidth or fabric bandwidth may be insufficient to service requests for cluster pages as measured by the bandwidth available when retrieving cluster pages from the memory host 106, etc.

Accordingly, the operating system 129 could select one or more cluster pages to migrate to another memory host 106 in order to resolve the resource contention. For example, if the resource contention is a lack of available cluster memory 116, the operating system 129 could select a number of cluster pages to migrate that would free a sufficient amount of cluster memory 116. As another example, if the resource contention were a lack of memory bandwidth or fabric bandwidth, the operating system 129 could select a number of cluster pages that are currently in use or predicted to be in use (e.g., based on principals of spatial or temporal locality) for migration to another memory host 106 sufficient to reduce the bandwidth consumed by the memory host 106. Similarly, if the resource contention were a latency issue, the operating system 129 could select a number of cluster pages that are currently in use or predicted to be in use (e.g., based on principles of spatial or temporal locality) for migration to another memory host 106.

Then, at block 706, the operating system 129 can select a destination memory host 106 for those cluster pages identified at block 703. This can be done using a variety of approaches. For example, a destination memory host 106 could be selected based on a current resource status (e.g., a current amount of free cluster memory 116, a current latency, a current amount of available bandwidth, etc.). Where resource availability conflicts, such as when one potential memory host 106 has more available cluster memory 116, but another potential memory host 106 has more available bandwidth or a third memory host 106 has a lower average latency, then weighting factors can be applied to the different resource constraints to prioritize selecting one memory host 106 with more of one type of resource available compared to another memory host 106.

Moving on to block 709, the operating system 129 can mark the pages identified in block 703 as being not present in the page table 131 of the local host 103. By marking the pages as not present, the operating system 129 will force a page fault to occur when a process or virtual machine executing on the local host 103 attempts to read or write the cluster page. The page fault handler of the operating system 129 can then handle the page fault by waiting for the page to be copied to the destination memory server 106 and then reading the page from the destination memory server 106.

Next, at block 713, the operating system 129 can flush the translation lookaside buffer of the processor of the local host 103. This can be done in order to avoid a process or virtual machine from accessing a cached copy of the cluster page mapping or from attempting to access the cluster page on the original memory host 106.

Proceeding to block 716, the operating system 129 can cause the cluster pages to be migrated from the original or current memory host 106 to the new memory host 106 selected at block 706. This can be done using a variety of approaches. For example, the operating system 129 could read the contents of each of the cluster pages and then write them to the new memory host 106 selected at block 706. Instead, the operating system 129 could send a message to the original or current memory host 106 to migrate the cluster pages to the new memory host 106. Once migration is complete, the original or current memory host 106 could send a response to the operating system 129 indicating that the move was complete. In this second approach, bandwidth is utilized more efficiently by avoiding the read of each page from the memory host 106 to the local host 103 that was previously described.

Then, at block 719, the operating system 129 can update the page table 131 and/or the local chunk map 133 of the local host 103 to reflect the location of the cluster pages on the destination memory host 106. For example, the local chunk map 133 could be updated to reflect the identity of the new memory host 106, the chunk of the cluster memory 116 used for the copied pages, and the offset within the cluster memory 116 where the chunk is located. If needed, the page table 131 could also be updated to reflect the mapping of the virtual page of a process or virtual machine to the new or modified entry in the local chunk map 133.

Next, at block 723, the operating system 129 can mark in the page table 131 that the cluster pages identified at block 703 are present. This can allow for the pages to be directly read or addressed by the process or virtual machine executing on the local host 103.

Subsequently, at block 726, the operating system 129 can then discard the cluster pages of the original memory host 106. For example, the operating system 129 could cause the local host 103 to send a message to the original memory host 106 to discard the cluster pages from its cluster memory 116.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

What is claimed is:

1. A system, comprising:
a processor; and
a non-transitory computer-readable medium storing machine-readable instructions that, when executed by the processor, cause a computing device to perform operations comprising:
selecting, with hypervisor of a local host in a cluster environment, a memory page, allocated to a virtual machine on the local host and stored on a first memory host in the cluster environment, to move to a destination memory host in the cluster environment;
selecting, with the hypervisor, a second memory host in the cluster environment as the destination memory host for the memory page based at least in part on amount of free memory available to the second memory host, an amount of memory bandwidth available to the second memory host, and a latency to access pages stored by the second memory host;
marking, with the hypervisor and in a page table of the local host, that the memory page stored on the first memory host in the cluster environment is not present;
preventing, with the hypervisor, the virtual machine from accessing a cached copy of the memory by flushing a translation lookaside buffer of the local host;
causing, with the hypervisor, the memory page to be migrated from the first memory host in the cluster environment to the second memory host in the cluster environment;
updating, with the hypervisor, the page mapping table to reflect that the page is stored on the second memory host in the cluster environment; and
marking, with the hypervisor and in the page table of the local host, that the page stored in the second memory host in the computing environment is present.

2. The system of claim 1, the operations further comprising:
determining that an amount of free memory available on the first memory host is below a predefined threshold value;
wherein the page table is marked in response to a determination that the amount of free memory available on the first memory host is below the predefined threshold value.

3. The system of claim 1, the operations further comprising:
determining that a latency to access pages stored by the first memory host is above a predefined threshold value;
wherein the page table is marked in response to a determination that the latency to access pages stored by the first memory host is above the predefined threshold value.

4. The system of claim 1, the operations further comprising:
determining that an amount of memory bandwidth available to the first memory host is below a predefined threshold;
wherein the page table is marked in response to a determination that the amount of memory bandwidth available to the first memory host is below the predefined threshold value.

5. The system of claim 1, the operations further comprising:
determining that the first memory host is to be powered off; and
wherein the page table is marked in response to a determination that the first memory host is to be powered off.

6. The system of claim 1, the operations further comprising:
pausing the virtual machine on the local host.

7. The system of claim 1 wherein the amount of memory bandwidth available to the second memory host is weighted differently from the amount of free memory available to the second memory host.

8. A computer-implemented method, comprising:
selecting, with hypervisor of a local host in a cluster environment, a memory page, allocated to a virtual machine on the local host and stored on a first memory host in the cluster environment, to move to a destination memory host in the cluster environment;
selecting, with the hypervisor, a second memory host in the cluster environment as the destination memory host for the memory page based at least in part on amount of free memory available to the second memory host, an amount of memory bandwidth available to the second memory host, and a latency to access pages stored by the second memory host;
marking, with the hypervisor and in a page table of the local host, that the memory page stored on the first memory host in the cluster environment is not present;
preventing, with the hypervisor, the virtual machine from accessing a cached copy of the memory by flushing a translation lookaside buffer of the local host;
causing, with the hypervisor, the memory page to be migrated from the first memory host in the cluster environment to the second memory host in the cluster environment;
updating, with the hypervisor, the page mapping table to reflect that the page is stored on the second memory host in the cluster environment; and
marking, with the hypervisor and in the page table of the local host, that the page stored in the second memory host in the computing environment is present.

9. The method of claim 8, further comprising:
determining that an amount of free memory available on the first memory host is below a predefined threshold value;
wherein the page table is marked in response to determining that the amount of free memory available on the first memory host is below the predefined threshold value.

10. The method of claim 8, further comprising:
determining that a latency to access pages stored by the first memory host is above a predefined threshold value;
wherein the page table is marked in response to determining that the latency to access pages stored by the first memory host is above the predefined threshold value.

11. The method of claim 8, further comprising:
determining that an amount of memory bandwidth available to the first memory host is below a predefined threshold;

wherein the page table is marked in response to determining that the amount of memory bandwidth available to the first memory host is below the predefined threshold value.

12. The method of claim 8, further comprising:
determining that the first memory host is to be powered off;
wherein the page table is marked in response to determining that the first memory host is to be powered off.

13. The method of claim 8, further comprising:
pausing the virtual machine on the local host.

14. The method of claim 8, wherein the amount of memory bandwidth available to the second memory host is weighted differently from the amount of free memory available to the second memory host.

15. A non-transitory, computer-readable medium storing instructions executable by a processor to perform operations comprising:
selecting, with hypervisor of a local host in a cluster environment, a memory page, allocated to a virtual machine on the local host and stored on a first memory host in the cluster environment, to move to a destination memory host in the cluster environment;
selecting, with the hypervisor, a second memory host in the cluster environment as the destination memory host for the memory page based at least in part on amount of free memory available to the second memory host, an amount of memory bandwidth available to the second memory host, and a latency to access pages stored by the second memory host;
marking, with the hypervisor and in a page table of the local host, that the memory page stored on the first memory host in the cluster environment is not present;
preventing, with the hypervisor, the virtual machine from accessing a cached copy of the memory by flushing a translation lookaside buffer of the local host;
causing, with the hypervisor, the memory page to be migrated from the first memory host in the cluster environment to the second memory host in the cluster environment;
updating, with the hypervisor, the page mapping table to reflect that the page is stored on the second memory host in the cluster environment; and
marking, with the hypervisor and in the page table of the local host, that the page stored in the second memory host in the computing environment is present.

16. The non-transitory, computer-readable medium of claim 15, the operations further comprising
determining that an amount of free memory available on the first memory host is below a predefined threshold value;
wherein the page table is marked in response to a determination that the amount of free memory available on the first memory host is below the predefined threshold value.

17. The non-transitory, computer-readable medium of claim 15, the operations further comprising:
determining that a latency to access pages stored by the first memory host is above a predefined threshold value;
wherein the page table is marked in response to a determination that the latency to access pages stored by the first memory host is above the predefined threshold value.

18. The non-transitory, computer-readable medium of claim 15, the operations further comprising:
determining that an amount of memory bandwidth available to the first memory host is below a predefined threshold;
wherein the page table is marked in response to a determination that the amount of memory bandwidth available to the first memory host is below the predefined threshold value.

19. The non-transitory, computer-readable medium of claim 15, the operations further comprising:
determining that the first memory host is to be powered off;
wherein the page table is marked in response to a determination that the first memory host is to be powered off.

20. The non-transitory, computer-readable medium of claim 15, the operations further comprising:
pausing the virtual machine on the local host.

* * * * *